Oct. 13, 1953     D. WHITEHEAD ET AL     2,655,118
DOUGH SHEETING APPARATUS FOR BAKERY MACHINES
Filed Aug. 13, 1951     2 Sheets-Sheet 1
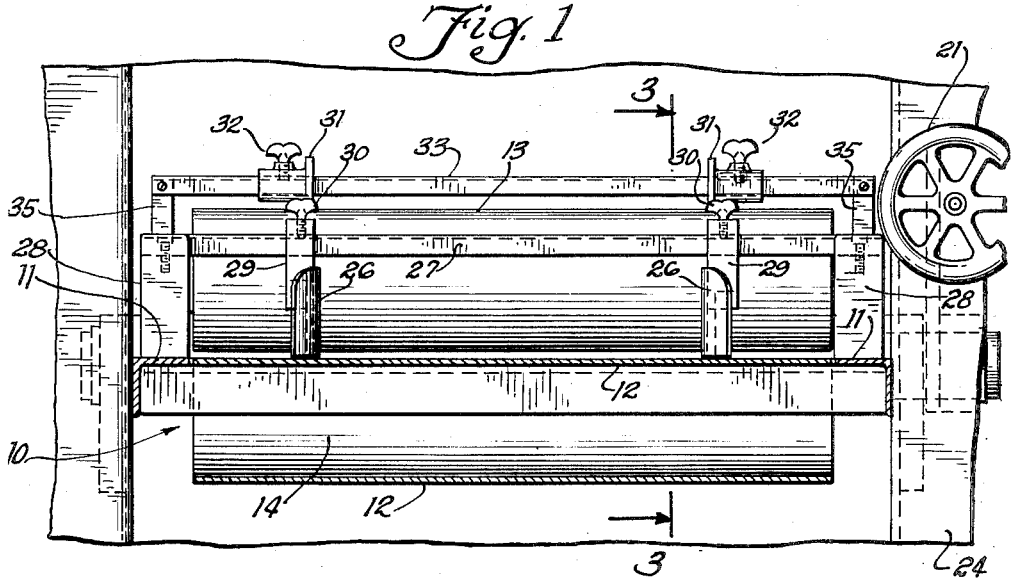
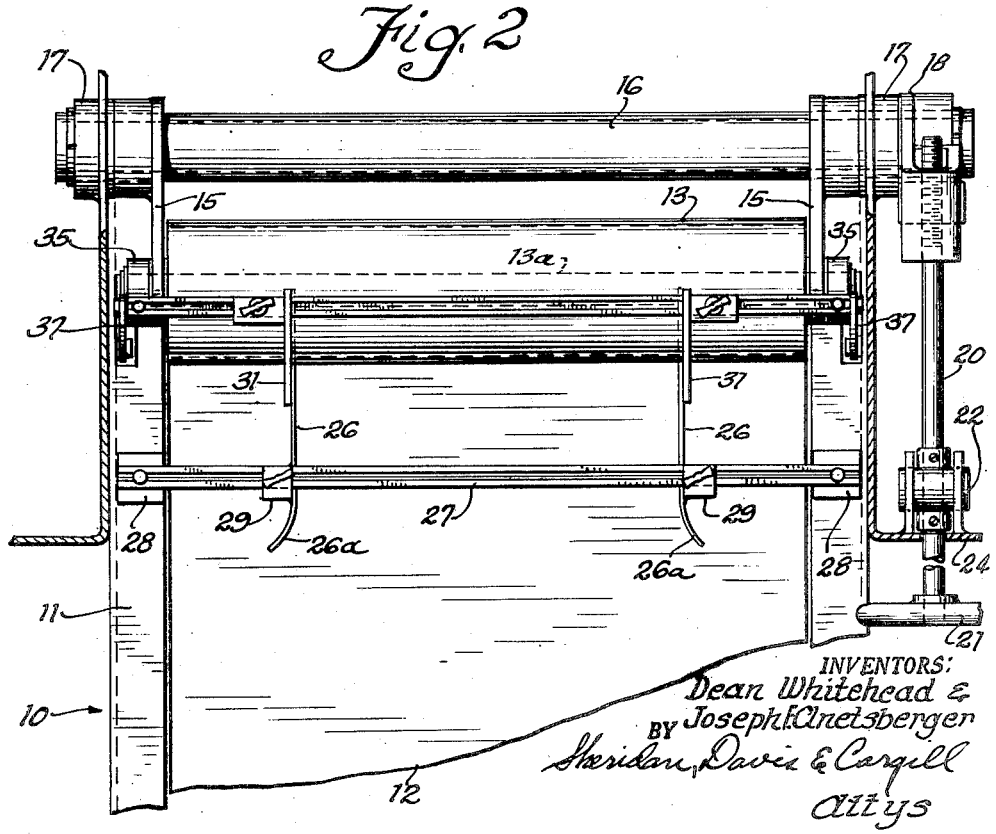
INVENTORS:
Dean Whitehead &
BY Joseph F. Anelsberger
Sheridan, Davis & Cargill
attys

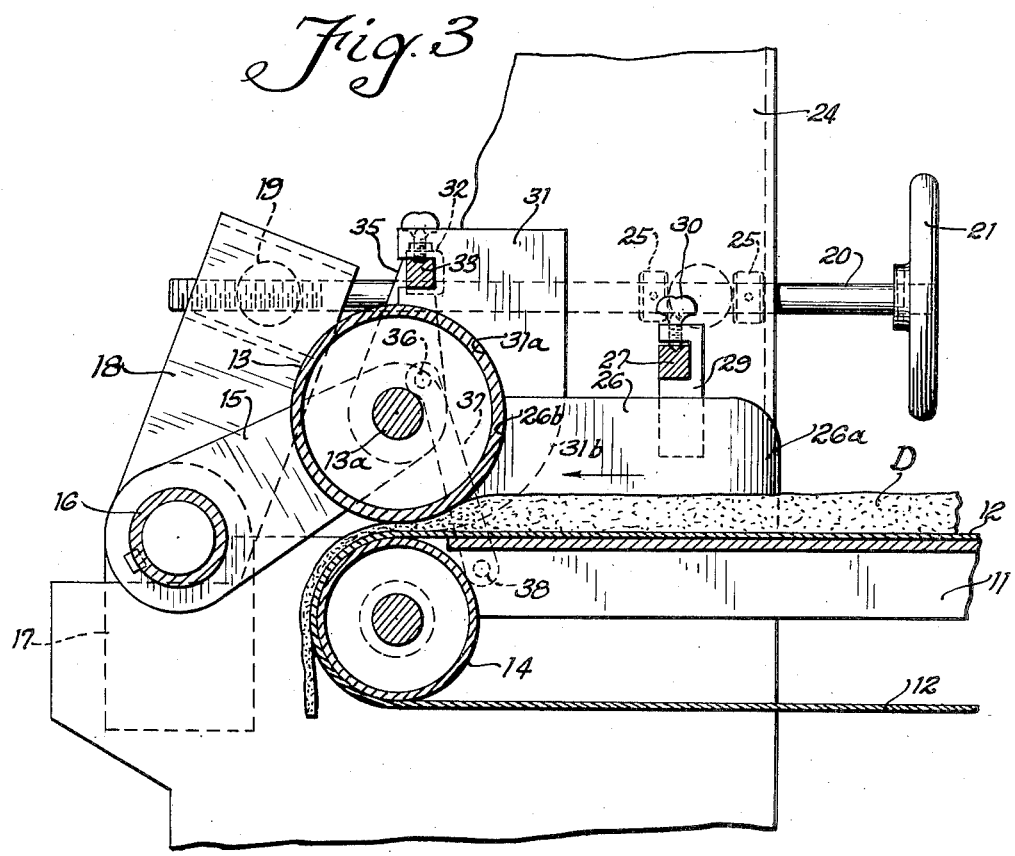
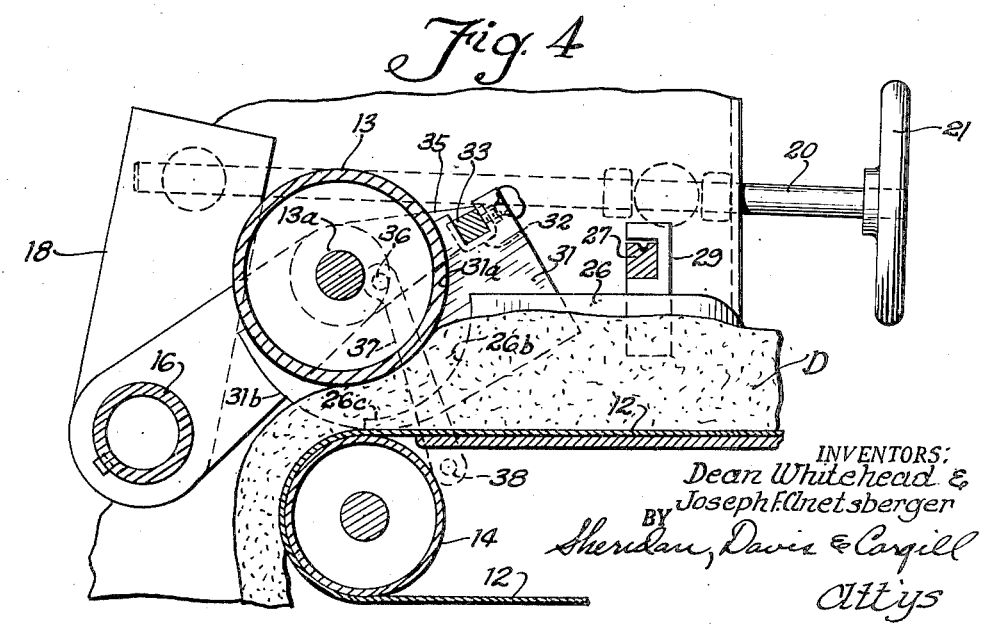

Patented Oct. 13, 1953

2,655,118

UNITED STATES PATENT OFFICE 2,655,118

DOUGH SHEETING APPARATUS FOR BAKERY MACHINES

Dean Whitehead, Oak Park, and Joseph F. Anetsberger, Northbrook, Ill., assignors to Anetsberger Brothers, Inc., Northbrook, Ill., a corporation of Illinois Application August 13, 1951, Serial No. 241,519

10 Claims. (Cl. 107—12)

This invention relates to dough sheeting apparatus for bakery machines. In dough rolling or sheeting apparatus employing a dough roller in cooperation with a conveyor belt carrying a dough mass or masses placed thereon in more or less irregular elongate form, it generally is desirable to confine the resulting sheets to selected widths as well as to a selected thickness, especially where such dimensions of the sheet are of importance in effecting the uniformity of the resulting products made from the sheet. Irregular elongate masses of dough passing between rollers which roll it into sheet form of predetermined thickness provide irregular edges which require trimming where the resulting product is to be made of a sheet or strips of dough of uniform width, as, for example, where sweet rolls are formed by the transverse slicing of a strip of dough wound in a helical form by a dough roller as the strip moves along a movable conveyor. Other bakery products likewise may, in the making thereof, require the use of strips or sheets of dough of uniform width or relatively straight edges, and in any event, the trimming of sheets of irregular edge formation and the reworking of the trimmings represents a loss of time and labor which may be substantial in bakeries having high production schedules.

An object of the present invention is to provide dough sheeting apparatus which enables masses of dough to be rolled to sheet form, or enables previous sheeted strips of dough to be re-rolled to predetermined thicknesses and predetermined widths.

Another object of the invention is to provide dough sheeting apparatus comprising a dough roller which is vertically adjustable with respect to a subjacent coacting roller or conveyor for varying the thickness of the resulting sheet formed by the dough carried on the conveyor, and guides which are laterally adjustable to positions for restricting to predetermined limits the transverse flow of dough during the rolling operation whereby the resulting sheet will have straight parallel edges and will be of the selected width.

An additional object of the invention is to provide in dough sheeting apparatus a roller which is vertically adjustable to enable the formation of sheets of selected thickness and a pair of main dough guides which cooperate with the roller and are laterally adjustable to positions for determining the width of the resulting dough sheet, and supplementary guides which cooperate with the roller and the main guides for preventing the lateral flow of dough beyond the main guides when the roller is in any of the elevated positions.

Other objects of the invention relate to various features of construction and arrangement of parts which will be apparent from a consideration of the following specification and accompanying drawings wherein:

Figure 1 is an elevational view of dough sheeting apparatus embodying the present improvements, the improvements being shown mounted above a cooperating dough conveyor of a bakery work table, which is shown in vertical section;

Fig. 2 is a broken plan view of the apparatus shown in Fig. 1;

Fig. 3 is a vertical sectional view taken on line 3—3 of Fig. 1;

Fig. 4 is a view similar to Fig. 3, showing the dough roller in an elevationally adjusted position.

In the drawing, a work table of the type used in bakeries is indicated generally by numeral 10, the table being provided with longitudinal side frame members 11 and an endless belt conveyer 12 forming a part of the table, the upper run of the belt carrying the dough to various operating mechanisms that may be located along the table, such as the dough sheeting mechanism about to be described.

The improved mechanism is shown located adjacent one end of the belt conveyor and comprises a roller sometimes termed a head roller 13 which, in the mechanism shown, is stationed above an end roller 14 about which the conveyor 12 passes. The head roller 13 is vertically adjustable with respect to the upper run of the conveyor for varying the thickness of the resulting sheet formed by passing a mass of dough D beneath the roller 13 in a direction from right to left, as viewed in Fig. 3. For the purpose of adjusting the roller 13 for the purpose just above referred to, it is shown as being rotatably mounted in arms 15 which support the roller shaft 13a, one arm being located adjacent each side of the apparatus. Each arm at its lower end is fixed to a transverse shaft 16 journaled in any suitable supports, such as indicated at 17. One end of the shaft 16 has secured thereto an operating arm 18 and carries a stud 19 rotatably secured to the arm and provided with a threaded passage for receiving the threaded end of an adjusting shaft 20, the opposite end of which is provided with a hand wheel 21. The shaft 20 passes through a bore provided in a stud 22 which is supported for rocking movement about its axis by a support or plate 24 located at one side of the machine, such as the right-hand side as viewed in Fig. 1. A pair of collars 25 secured to the shaft 20 at each side of the stud 22 prevents axial displacement of the shaft. Rotation of the shaft by means of the hand wheel 21 will effect rocking movement of the arm 18 about the axis of the shaft 16, which in turn produces rocking movement of the two arms 15 in the upper ends of which the roller shaft 13a is journaled or otherwise supported. Hence, by rotation of the shaft 21, the roller 13 can be raised or lowered for varying the space between the roller and adjacent portion of the conveyor 12 for forming a dough sheet of selected thickness.

Since the mass of dough D may not be of uniform width or thickness as it approaches the roller 13, it is desirable to provide guides for limiting the lateral expression or flow of the dough as it passes beneath the roller, whereby the resulting dough sheet will have straight parallel edges spaced apart a selected distance. In the drawing, a pair of main dough guides 26 is shown in the form of plates preferably having forward ends which are flared outwardly, as indicated at 26a, which better direct the mass of dough on the conveyor between the guides. For the purpose of enabling the guides 26 to be adjusted laterally and for supporting the guides firmly in adjusted position, a transverse bar 27 is shown supported by suitable standards 28 which are secured by any suitable means to the side frames 11 of the table. The guides 26 are provided with vertically disposed clamp members 29, welded or otherwise secured thereto and each having an open recess in a vertical face thereof for accommodating the cross bar 27. A clamp screw 30 carried by the member 29 is provided for clamping each guide member in laterally adjusted position on the bar 27. As shown in Fig. 4, the bar preferably has a longitudinal V-shaped groove in its upper surface for receiving the tapered ends of the screws 30.

The forward ends 26b of the guides 26 are curved to conform to the periphery of the roller 23. It will be noted that the curved end portions of the guides provide extensions which project substantially beneath the roller. These lower extending portions indicated by reference 26c have a minimum thickness at the forward ends corresponding to the desired minimum thickness of dough to be sheeted by the apparatus, inasmuch as with the guides in the positions shown in Fig. 3 they limit downward movement of the roller toward the surface of the conveyor. When the roller is in the lowermost position shown in Fig. 3, the curved surface 26b of the guides 26 contact or substantially contact the roller, and as the dough moves forwardly or from right to left as viewed in Fig. 3, beneath the roller, the guides prevent the lateral expression or flow of the dough beyond the planes of the guides to provide a sheet of a predetermined width, whereas the spacing of the roller above the conveyor determines the thickness of the sheet.

It will be apparent that if the roller 13 is raised from the position shown in Fig. 3, spaces will be provided between the periphery of the roller and the curved edges 26b of the guides through which dough might be expressed during the dough sheeting operation and thus form irregularities at the edges of the resulting sheet. For the purpose of preventing such lateral expression of the dough beyond the planes of the main guides 26, supplementary guides are provided which will close the spaces above referred to automatically in all positions of adjustment of the roller 23 above lowermost position shown in Fig. 3. The supplementary guide plates above referred to are indicated by the numeral 31. The plates 31, as shown in Figs. 3 and 4, are provided with forward concave surfaces 31a which correspond to an arc of the roller periphery and are provided with outer curved or convex surfaces 31b. Each of the plates 31 is provided with a suitable clamping member 32 which enables the same to be clamped to a transverse bar 33 in laterally adjusted positions. The bar 33 is secured adjacent the ends thereof to arms 35 which are swingably mounted on the roller shaft 13a. Secured to each of the arms 35, as by pivot member 36, are links 37, the lower ends of which are pivotally supported as at 38 to a portion of the table, such as to the side frame members 11. But one such link may be employed if desired.

In the position of the parts shown in Fig. 3, the roller 13 is, as stated above, in its lowermost position, and the supplementary guide plates 31 are in a substantially vertical position with the lower curved arcuate extensions thereof projecting partially beneath the roller. With the supplementary plates 31 adjusted laterally into close contact with the outer faces of the main guide plates 26, they will prevent passage of dough between the space between the lower periphery of the roller and the curved edges 26b of the plates 26 whenever the roller 13 is elevated above the position shown in Fig. 3, since due to the action of the links 37 the arms 35 will be swung in a clockwise direction, as viewed in Figs. 3 and 4, as the roller is elevated by swinging action in a counter-clockwise direction of the arms 15, as viewed in said figures.

In Fig. 4, the roller 13 is shown in an elevated position and the supplemental guide plates 31 are shown in a position clockwise removed from the position of the plates shown in Fig. 3. The width of the arcuate portions of the supplementary guides increases progressively from the forward toward the rear thereof whereby the supplemental guides in all positions of adjustment of the arms 31, will overlap portions of the respective plates 26. Hence, in all positions of vertical adjustment of the roller 13, the supplementary guides 31 close the spaces between the roller periphery and the curved edges 26b of the main guide plates 26. Hence, it will be seen that while the roller 26 may be adjusted to desired positions for providing a dough sheet of the desired thickness, the main and supplementary guides will provide barriers between the roller and conveyor which prevent lateral expression of the dough beyond the planes of the guides. The guides, as stated, may be adjusted laterally to positions which will determine the width of the dough sheet, which will be provided with straight parallel side edges.

By reason of the mechanism described for adjusting the roller 13 vertically in either direction, the supplementary dough guides 31 are likewise automatically adjusted correlatively to different angular positions for coaction with the main guides 26 in preventing lateral expression of the dough beyond the guides as the dough passes beneath the roller 13.

While a structure which is illustrative of the present invention has been shown and described, it will be apparent that variations in the details thereof may be resorted to within the spirit of the invention defined by the appended claims.

What is claimed is:

1. In dough sheeting apparatus, a belt conveyor, a dough roller located above the conveyor for cooperation therewith in sheeting dough passing between the roller and conveyor, means supporting the roller for adjustment toward and away from the conveyor to positions determining the thickness of the sheeted dough, a main pair of dough guides comprising vertically disposed plates located above the conveyor for laterally confining dough approaching the roller and spaced apart a distance corresponding to the desired width of the dough sheet, said plates being provided with convex forward edges conforming to an arc of the roller and positioned in close proximity to the roller when the roller is in lowermost position for preventing lateral flow of dough beyond the plane of the guides during the sheeting operation, a pair of supplementary guides each cooperating with one of said main guides and provided with arcuate portions cooperating with the roller for obstructing lateral flow of the dough beyond the plane of the guides when the roller is raised above said lowermost position, a transverse support for each pair of guides, and laterally adjustable means for securing the guides of each pair to the respective support for lateral adjustment of the guides to positions predetermining the width of the dough sheet.

2. In dough sheeting apparatus, a pair of cooperating sheeting members movable apart vertically to positions for predetermining the thickness of the dough sheets, adjusting means for one of said sheeting members for varying the spacing between said members in correspondence with the selected thickness of the sheeting, a pair of spaced apart laterally adjustable main dough guides cooperating with said sheeting members when the latter are in relative positions for producing sheets of minimum thickness for limiting lateral expression of dough for predetermining the width of the sheets, a pair of supplementary dough guide members each laterally contacting one of said main dough guides and both provided with arcuate portions contacting said adjustable sheeting member, and means operable by said adjusting means for moving said supplementary dough guides into positions relative to said adjustable sheeting member and the respective main dough guide for preventing the expression of sheeted dough laterally beyond said main guides when said adjustable sheeting member is moved to positions for providing dough sheets of greater than minimum thickness.

3. In dough sheeting apparatus, a pair of cooperating sheeting members relatively movable apart to positions for predetermining the thickness of the dough sheets, a pair of laterally adjustable main dough guides intermediate the ends of the sheeting members and between which the dough to be sheeted is adapted to move and each having a barrier portion disposed between said sheeting members and cooperating therewith in limiting the expression of dough by the sheeting members laterally beyond said guides for producing sheets having widths corresponding to the distance between the guides when the sheeting members are in relative positions for producing sheets of minimum thickness, and a pair of laterally adjustable supplementary dough guides each cooperating with the barrier portion of one of said main guides and having arcuate portions cooperating with the sheeting members for preventing expression of dough laterally beyond the respective barrier portions of the main dough guides when the sheeting members are spaced apart for producing sheets of greater than minimum thickness.

4. In dough sheeting apparatus, an endless conveyor for dough to be sheeted, a dough roller above the conveyor and cooperating therewith for sheeting dough passing between the same, means supporting the roller for adjustment from and to a lowermost position above the conveyor determining the minimum thickness of a sheet of dough, a pair of laterally adjustable main dough guides for confining therebetween the unsheeted dough as it approaches the roller, said guides having forward end portions of arcuate form conforming to said roller and having lower extensions constituting barriers preventing the lateral expression of dough when the roller is in lowermost position whereby the space between said extensions limits the width of the dough sheet, and a pair of supplementary dough guides each located in sliding contact with respect to a side wall of one of said main dough guides and having arcuate portions movable beneath the roller to provide barriers preventing the passage of dough laterally between the roller and the arcuate ends of the main guides when the roller is in a position above said lowermost position, and means supporting said supplementary dough guides for such arcuate movement.

5. In dough sheeting apparatus, an endless conveyor for dough to be sheeted, a dough roller above the conveyor and cooperating therewith for sheeting dough passing between the same, means supporting the roller for adjustment from and to a lowermost position above the conveyor determining the minimum thickness of the sheeted dough, a pair of laterally adjustable main dough guides for confining therebetween the unsheeted dough as it approaches the roller, said guides having forward end portions of arcuate form conforming to said roller and having lower extensions constituting barriers limiting the lateral expression of dough to the planes of the guides when the roller is in lowermost position whereby the space between said extensions limits the width of the dough sheet, a pair of laterally adjustable supplementary dough guides each provided with an end portion having a concave edge conforming to an arc of the roller, means mounting the supplementary guides adjacent the upper ends thereof for swinging movement about the roller axis with said concave edges in contact with the roller, the opposite edge of each of said portions being convex and progressively diverging from the respective concave edge in the direction of the mounted ends and providing a free lower end adapted to seat between the roller and conveyor when the latter is in the lowermost position, and means for moving the supplementary guides arcuately about the roller as the latter is elevated above said lowermost position for closing the space between the roller and the main guides for preventing expression of dough laterally beyond the main guides in all positions of the roller above said lowermost position.

6. In a dough sheeting mechanism, an endless conveyor, a dough roller above the conveyor and cooperable therewith for sheeting dough passing between the same, means supporting the roller for adjustment to positions above the conveyor for predetermining the thickness of the dough sheets, laterally adjustable main dough guides on the conveyor located intermediate the ends of the roller and provided with portions extending between the roller and conveyor to provide barriers limiting the lateral expression of the dough to sheets of widths corresponding to the distance between the guides when the roller is in the lowermost position transverse supporting means coaxially mounted relative to the roller for arcuate swinging movement about the roller, and a pair of supplementary dough guides adjustably mounted on said supporting means for adjustment laterally each for sliding contact with one side of each of said dough guides and having an arcuate end portion for closing the space between the roller and the contiguous main dough guide for preventing expression of dough laterally through said space when the roller is in a position of elevation above said lowermost position.

7. In dough sheeting mechanism, an endless conveyor, a dough roller above the conveyor and cooperable therewith for sheeting dough passing between the same, means supporting the roller for adjustment to positions above the conveyor for predetermining the thickness of the dough sheets, a pair of upright main dough guides contacting the conveyor and located in advance of the roller and provided with forward arcuate ends contacting the roller and having portions extending beneath the roller to provide barriers obstructing lateral expression of dough beyond the planes of the guides when the roller is in lowermost position, means supporting the dough guides for adjustment laterally to positions determining the width of the dough sheets, a pair of supplementary dough guides adapted to be positioned each in slidable side contacting relation with one of the main dough guides and provided with lower barrier portions having forward concave edges conforming to and contacting an arc of the roller and having rear convex edges, said portions being of progressively greater width from the lower to the upper ends whereby as said portions are advanced or retracted arcuately to positions between the roller and conveyor they close the space between the arcuate ends of the main guides and the roller as the latter is moved to or from positions above said lowermost position, swingable supporting means for said supplementary guides mounted coaxially with respect to the roller whereby the concave forward edges of the supplementary guides remain in contact with the roller as the supplementary guides are moved arcuately, and means for constraining said supporting means to swing about said axis as said roller is advanced to or retracted from positions above said lowermost position for effecting said arcuate movements of said supplementary guides.

8. In a dough sheeting mechanism, a supporting structure, an endless conveyor on said structure, a dough roller above the conveyor and cooperable therewith for sheeting dough passing between the same, a shaft on which said roller is mounted, rockable supports in which the roller shaft is journalled, adjusting means for rocking the support for moving the roller away from or toward the conveyor to positions determining the thickness of the sheeted dough, a transverse support, a pair of main dough guides attached to the support for lateral adjustment to positions for determining the width of the dough sheet, said guides comprising vertical plates disposed along the conveyor in advance of the roller and provided with arcuate forward ends contacting the roller when the latter is in the lowermost position and provided with forward extensions disposed between the roller and conveyor for limiting lateral expression of dough beyond the planes of the guides when the roller is in said lowermost position, a swingable transverse support having end members pivotally mounted on the roller shaft, a link pivotally connected at one end to one of said members and at the other end pivotally attached to said structure whereby movement of the roller by said rockable support effects downward arcuate movement of said transverse support about the shaft as the roller is moved away from the conveyor and effects upward arcuate movement of the support as the roller is moved toward said conveyor, and a pair of supplementary dough guides carried by said transverse support each in side contacting relation with respect to one of said main dough guides and each comprising a lower arcuate portion movable by and in the direction of movement of the transverse support between the roller and conveyor as the roller is moved in one direction or the other, said lower arcuate portions of the supplementary guides being shaped to maintain contact at the forward edges thereof with the roller and to overlap the respective main guides in all positions of adjustment of the roller for obstructing lateral expression of dough beyond the planes of the main guides when the roller is above said lowermost position.

9. In dough sheeting apparatus, an endless conveyor for dough to be sheeted, a vertically adjustable sheeting roller above the conveyor for cooperation with the conveyor for sheeting dough passing therebetween, a pair of main dough guides comprising vertical plates disposed on the conveyor, means supporting said guides in laterally spaced apart positions determining the width of the sheeted dough, said dough guides having arcuate forward ends conforming to an arc of the roller and adapted for contact with the roller through arcs extending from the lowermost portion of the roller periphery to portions above the normal level of unsheeted dough adjacent the roller, said extensions constituting barriers preventing expression of dough laterally beyond the planes of the guides and limiting downward movement of the roller toward the conveyor at a position determining the minimum thickness of the sheeted dough, a pair of supplementary dough guides each located in sliding side contacting relation with one of said main guides, movable means supporting said supplementary guides for movement progressively into positions for closing the spaces between the arcuate ends of the respective main guides and the roller as the roller is moved upwardly from the lowermost position and for retracting the supplementary guides progressively from said positions as the roller is moved toward said lowermost position, and means for actuating said movable means.

10. In dough sheeting apparatus, a conveyor for dough to be sheeted, a sheeting roller above and cooperable with the conveyor for sheeting dough passing therebetween, means supporting the roller for movement to selected distances from the conveyor for determining the thickness of the sheeted dough, a pair of relatively stationary but laterally adjustable main dough guides above the conveyor for limiting the width of the dough sheets to the spacing between the guides when the roller is in lowermost position relative to the conveyor, a pair of supplementary dough guides each located in contacting relation with one of said main dough guides at one side thereof and both shiftable to positions for cooperation with the main dough guides and having arcuate portions cooperating with the roller in preventing the expression of dough laterally beyond the main guides when the roller is in a position above said lowermost position, means for swinging the roller supporting means for moving the roller to and from said lowermost position, and means for effecting the shifting of the supplementary dough guides into said cooperating positions concurrently with the movements of the roller to positions above said lowermost position.

DEAN WHITEHEAD.
         JOSEPH F. ANETSBERGER.

References Cited in the file of this patent

UNITED STATES PATENTS

| Number | Name | Date |
|---|---|---|
| 773,380 | Euler | Oct. 25, 1904 |
| 1,007,732 | Raskin et al. | Nov. 7, 1911 |
| 1,518,534 | Metcalf | Dec. 9, 1924 |
| 1,542,348 | Ostrom | June 16, 1925 |
| 1,803,991 | Bainbridge | May 5, 1931 |